UNITED STATES PATENT OFFICE.

FRITZ HOFMANN, KONRAD DELBRÜCK, AND KURT MEISENBURG, OF ELBERFELD, GERMANY, ASSIGNORS TO FARBENFABRIKEN VORM. FRIEDR. BAYER & CO., OF ELBERFELD, GERMANY, A CORPORATION OF GERMANY.

PROCESS OF PRODUCING BETA-GAMMA-DIMETHYLERYTHRENE.

1,069,422. Specification of Letters Patent. Patented Aug. 5, 1913.

No Drawing. Application filed April 16, 1912. Serial No. 691,216.

*To all whom it may concern:*

Be it known that we, FRITZ HOFMANN, KONRAD DELBRÜCK, and KURT MEISENBURG, doctors of philosophy, chemists, citizens of the German Empire, residing at Elberfeld, Germany, have invented new and useful Improvements in Processes of Producing Beta-Gamma-Dimethylerythrene, of which the following is a specification.

Our invention concerns a new and valuable process which results in an excellent yield of the erythrene hydrocarbon beta-gamma-dimethylerythrene and which consists in distilling pinacone with a normal sulfate of an acid reaction.

The process proceeds according to the following equation:

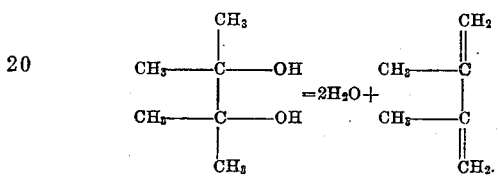

In order to illustrate the new process more fully the following example is given, the parts being by weight:—1000 parts of pinacone are mixed with 100 parts of alum and the resulting mixture is heated to 140–150° C. Dimethylerythrene and water distil over besides pinacone hydrate and small quantities of pinacolin. The beta-gamma-dimethylerythrene isolated from the mixture boils at 68 to 69° C.

Other of the above mentioned salts may be used *e. g.* iron alum, chrome alum, copper sulfate, iron sulfate, aluminium sulfate, etc.

We claim:—

1. Process for producing an erythrene hydrocarbon, which process comprises distilling a pinacone with a normal sulfate having an acid reaction.

2. Process for producing an erythrene hydrocarbon, which process comprises distilling a pinacone with alum.

3. Process for producing beta-gamma-dimethylerythrene, which process consists in first distilling pinacone with a normal sulfate of an acid reaction and then separating the beta-gamma-dimethylerythrene, substantially as described.

4. Process for producing beta-gamma-dimethylerythrene, which process consists in first distilling pinacone with alum and then separating the beta-gamma-dimethylerythrene, substantially as described.

In testimony whereof we have hereunto set our hands in the presence of two subscribing witnesses.

FRITZ HOFMANN, [L. S.]
KONRAD DELBRÜCK. [L. S.]
KURT MEISENBURG. [L. S.]

Witnesses:
HELEN NUFER,
A. NUFER.